(12) United States Patent
Yegin et al.

(10) Patent No.: US 8,633,678 B2
(45) Date of Patent: Jan. 21, 2014

(54) ELECTRIC VEHICLE SUPPLY EQUIPMENT WITH OVER-CURRENT PROTECTION

(75) Inventors: Sural Yegin, Chula Vista, CA (US); Carlos E. Ramirez, San Diego, CA (US); Victor Soto, Escondido, CA (US); Kenneth J. Brown, Chula Vista, CA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 337 days.

(21) Appl. No.: 13/104,738

(22) Filed: May 10, 2011

(65) Prior Publication Data

US 2012/0286729 A1 Nov. 15, 2012

(51) Int. Cl.
*H01M 10/46* (2006.01)

(52) U.S. Cl.
USPC ........................................ 320/134

(58) Field of Classification Search
USPC .............. 320/107, 109, 134, 136; 361/31, 79, 361/93.9
See application file for complete search history.

(56) References Cited

U.S. PATENT DOCUMENTS

| | | | |
|---|---|---|---|
| 4,581,705 A | 4/1986 | Gilker et al. |
| 4,739,351 A | 4/1988 | Feldman |
| 5,258,889 A | 11/1993 | Belanger, Jr. |
| 5,341,083 A | 8/1994 | Klontz et al. |
| 5,563,491 A | 10/1996 | Tseng |
| 5,784,285 A | 7/1998 | Tamaki et al. |
| 5,971,597 A | 10/1999 | Baldwin et al. |
| 6,232,743 B1 | 5/2001 | Nakanishi |
| 6,497,656 B1 | 12/2002 | Evans et al. |
| 6,512,682 B2 | 1/2003 | Cohen et al. |
| 6,633,823 B2 | 10/2003 | Bartone et al. |
| 6,741,442 B1 | 5/2004 | McNally et al. |
| 6,769,521 B2 | 8/2004 | Saito et al. |
| 6,993,417 B2 | 1/2006 | Osann, Jr. |
| 7,046,716 B1 | 5/2006 | Miao |
| 7,141,891 B2 | 11/2006 | McNally et al. |
| 7,171,461 B2 | 1/2007 | Ewing et al. |

(Continued)

FOREIGN PATENT DOCUMENTS

| | | |
|---|---|---|
| EP | 2214287 A2 | 8/2010 |
| GB | 2438979 A | 12/2007 |

(Continued)

OTHER PUBLICATIONS www.unpluggd.com, "How to Conserve Energy, Starting at the Plug," Sep. 28, 2010, 4 pages.

(Continued)

*Primary Examiner* — Edward Tso
(74) *Attorney, Agent, or Firm* — Marger Johnson & McCollom PC

(57) ABSTRACT

An EVSE system includes an electric vehicle supply circuit having overcurrent protection circuit to prevent excessive current from flowing to the electric vehicle. A current limit may be set by a manufacturer of the EVSE, by a user of the EVSE, by an electric utility, by the EVSE itself in response to a control pilot signal, etc. The current limit may be set to prevent tripping an overcurrent protection device on a branch circuit for the EVSE, to accommodate one or more parameters of an electric vehicle charging facility, etc. The overcurrent protection feature may be integrated into a controller for the electric vehicle supply circuit, or it may be operate independently of the controller.

36 Claims, 9 Drawing Sheets

(56) References Cited

U.S. PATENT DOCUMENTS

| | | |
|---|---|---|
| 7,196,900 B2 | 3/2007 | Ewing et al. |
| 7,368,830 B2 | 5/2008 | Cleveland et al. |
| 7,450,362 B2 | 11/2008 | Muller et al. |
| 7,956,570 B2 | 6/2011 | Lowenthal et al. |
| 8,138,715 B2 | 3/2012 | Lowenthal et al. |
| 2001/0039626 A1 | 11/2001 | Jauert |
| 2003/0062990 A1 | 4/2003 | Schaeffer, Jr. et al. |
| 2003/0120442 A1 | 6/2003 | Pellegrino et al. |
| 2003/0141852 A1* | 7/2003 | Ljunggren .............. 320/162 |
| 2003/0161279 A1 | 8/2003 | Sherman |
| 2004/0034484 A1 | 2/2004 | Solomita et al. |
| 2004/0054905 A1 | 3/2004 | Reader |
| 2004/0155722 A1 | 8/2004 | Pruchniak |
| 2005/0147071 A1 | 7/2005 | Karaoguz et al. |
| 2005/0185669 A1 | 8/2005 | Welborn et al. |
| 2005/0203987 A1 | 9/2005 | Ewing et al. |
| 2005/0243787 A1 | 11/2005 | Hong et al. |
| 2006/0094461 A1 | 5/2006 | Hameed et al. |
| 2006/0259538 A1 | 11/2006 | Ewing et al. |
| 2007/0076340 A1 | 4/2007 | Ewing et al. |
| 2007/0081505 A1 | 4/2007 | Roberts |
| 2007/0112939 A1 | 5/2007 | Wilson et al. |
| 2007/0130243 A1 | 6/2007 | Ewing et al. |
| 2007/0136453 A1 | 6/2007 | Ewing et al. |
| 2007/0140238 A1 | 6/2007 | Ewing et al. |
| 2007/0198748 A1 | 8/2007 | Ametsitsi |
| 2008/0019063 A1 | 1/2008 | Muller et al. |
| 2008/0019068 A1 | 1/2008 | Reynolds et al. |
| 2008/0079389 A1* | 4/2008 | Howell et al. .............. 320/104 |
| 2008/0088180 A1 | 4/2008 | Cash et al. |
| 2008/0136261 A1 | 6/2008 | Mierta |
| 2009/0021213 A1 | 1/2009 | Johnson |
| 2009/0259603 A1 | 10/2009 | Housh et al. |
| 2009/0285189 A1 | 11/2009 | Kim et al. |
| 2010/0268411 A1 | 10/2010 | Taguchi |
| 2011/0029144 A1 | 2/2011 | Muller et al. |
| 2011/0029146 A1 | 2/2011 | Muller et al. |
| 2011/0037429 A1 | 2/2011 | DeBoer et al. |
| 2011/0095723 A1* | 4/2011 | Bhade et al. .............. 320/109 |
| 2011/0144823 A1 | 6/2011 | Muller et al. |
| 2011/0175569 A1 | 7/2011 | Austin |
| 2011/0258112 A1 | 10/2011 | Eder et al. |
| 2012/0123710 A1 | 5/2012 | Gaul et al. |

FOREIGN PATENT DOCUMENTS

| | | |
|---|---|---|
| JP | 09-107605 A | 4/1997 |
| JP | 10-155245 A | 6/1998 |
| JP | 11-122714 A | 4/1999 |
| JP | 3074208 U | 10/2000 |
| JP | 3093370 U | 2/2003 |
| JP | 2008-302771 | 12/2008 |
| WO | 2006091565 A2 | 8/2006 |
| WO | 2008073453 A1 | 6/2008 |

OTHER PUBLICATIONS

ADMMicro EMS, "Controllers," 2006, 1 page.
ADMMicro, "What We Do," Controllers, 2006, 3 pages.
AeroVironment, Inc., "Electric Vehicle Charging Infrastructure for the EV Superhighway," 2998m 4 pages.
Architectural Lighting Magazine, "Load Shedding and Lighting: The New Frontier," printed Mar. 20, 2009, 2 pages.
E-Mon, Energy Monitoring Products, E-Mon D-Mon Metering Products, printed Jul. 7, 2009, 1 page.
Wattsupmeters, "Smart Circuit—The Intelligent Electricity Monitor that Can Measure and Switch Loads via the Internet, Sep. 2005," 6 pages.
Written Opinion and International Search Report for PCT/US2010/044022, dated Feb. 24, 2011, 10 pages.
I.M.S. Industrial Measurement Systems Ltd., "General Information," 2006, 2 pages.
Leviton, "Architectural Lighting Controls," 2007, 39 pages.
Lutron, "Quantum—Whole-Building Light Management Solution," Apr. 30, 2009, 28 pages.
Lutron, "Quantum Total Light Management, Operation and Maintenance Manual," Apr. 2009, 212 pages.
Quad Logic: Power Line Communications Technology, "Where There is Power . . . Quadlogic Brings You Knowledge," 2008, 2 pages.
RS485 serial information, http://www.lammertbies.nl/comm/info/RS-485.html.
Shadowmetering, "About Shadow Metering Inc. Jacksonville, Florida," 2009, 1 page.
Site Controls: Products and Services, "The Site-Command Platform," 2009, 1 page.
GM Electric Power/Advanced Systems, "Plug-In Electric Vehicles—Standards," Ontario Smart Grid Forum, Oct. 14, 2008, 17 pages.
Society of Automotive Engineers, Inc., Surface Vehicle Recommended Practice, 2001, 32 pages.
International Preliminary Report on Patentability for PCT/US2009/062825, dated May 3, 2011, 9 pages.
International Preliminary Report on Patentability for PCT/US2011/020694, dated Jul. 17, 2012, 8 pages.
International Search Report and Written Opinion for PCT/US2011/020694, dated Sep. 22, 2011, 11 pages.

\* cited by examiner

ELECTRIC VEHICLE SUPPLY EQUIPMENT WITH OVER-CURRENT PROTECTION

BACKGROUND

FIG. 1 illustrates a typical arrangement for charging an electric vehicle (EV) such as a plug-in electric vehicle (PEV), plug-in hybrid electric vehicle (PHEV), etc. Electric vehicle supply equipment (EVSE) 10 receives electric power from a utility grid or other source and transfers it to the vehicle 12 through a cord 14 and connector 16 that plugs into a mating inlet 18 on the vehicle. In this example, the AC power from the grid is converted to DC power by an on-board charger 20 in the vehicle to charge the battery 22.

The EVSE, which is also referred to as supply equipment, a vehicle charger, a charging station, a charger, etc., may be realized in several different mechanical configurations. EVSE are frequently installed as wall-mounted units in garages and on buildings where vehicles can be parked inside or close to the building. In outdoor locations, especially parking lots and curbsides, EVSE are commonly installed on pedestals. EVSE may also take the form of a cord set which is sometimes referred to as a travel charger, portable charger, handheld charger, etc.

The connector 16 and inlet 18 typically utilize a conductive connection in which the electrical conductors in one connector make physical contact with the electrical conductors in the other connector. Other systems utilize inductive coupling in which energy is transferred through magnetic coils that are electrically insulated from each other.

To promote interoperability of vehicles and supply equipment, the Society of Automotive Engineers (SAE) has developed various standards that define mechanical configurations of connectors for charging vehicles, as well as the arrangement and function of electrical contacts within the connectors. One standard known as SAE J1772 is of particular interest because virtually every automaker in the U.S., Japan and Europe has announced plans to use J1772 compatible connectors for models sold in the U.S. This standard relates to conductive charging systems and covers both AC and DC connections.

FIG. 2 illustrates a reference design for a conductive vehicle charging system under the J1772 standard. A vehicle 30 is coupled to EVSE 28 through a coupling inlet 26 on the vehicle and coupling connector 24, which is typically connected to the EVSE through a flexible cord. AC power is transferred to the vehicle through terminals 1 and 2 of the coupling. A charging circuit interrupting device (CCID) 44 interrupts the flow of AC power if the difference between the current flowing in the two AC conductors exceeds a predetermined threshold, which typically indicates a potential ground fault condition. An on-board charger 32 in the vehicle converts the AC power to DC current for charging the battery 34.

Terminal 5 of the coupling connects safety grounding conductors in the EVSE and the vehicle. A control pilot signal is connected through terminal 6 and enables basic two-way communications between the EVSE and the vehicle. For example, the control pilot enables a charge controller 36 in the vehicle to determine the maximum amount of AC current available from the EVSE, while it enables the EVSE to determine if the vehicle requires ventilation for charging and if the vehicle is ready to receive power. The return path for the control pilot signal is through the grounding path which enables it to serve a safety function: if the safety pilot signal is not present, control electronics 42 in the EVSE assumes the ground path has been compromised and causes the CCID to interrupt the flow of AC power to the vehicle.

A proximity device 40 enables the vehicle to verify that it is mechanically connected to an EVSE system. The implementation details of proximity detection are left to the discretion of the manufacturer, but the J1772 standard identifies the use of magnetic proximity detectors as an acceptable technique. For AC charging, only terminals 1, 2, 5, and 6 are required. DC charging requires the use of optional terminals 3 and 4, as well as the establishment of a more sophisticated communication link through optional terminals 7-9 which are not illustrated.

The J1772 standard defines different types of charging including AC Level 1, which utilizes the most common 120 Volt, 15 Amp grounded receptacle, and AC Level 2, which utilizes a dedicated AC power connection at 208-240 Volts nominal and 32 Amps maximum. DC charging is defined as a method that utilized dedicated direct current (DC) supply equipment.

SUMMARY

An electric vehicle supply circuit may include a charge circuit interrupting device to interrupt a flow of power from a power source to an electric vehicle, a controller coupled to the charge circuit interrupting device, where the controller is constructed and arranged to control the charge circuit interrupting device in response to a control pilot signal from the electric vehicle, and an overcurrent protection circuit constructed and arranged to prevent excessive current from flowing to the electric vehicle. The overcurrent protection circuit may be arranged to control the charge circuit interrupting device to prevent excessive current from flowing to the electric vehicle.

The overcurrent protection circuit may include a current sensor coupled to the controller, and the controller may be constructed and arranged to prevent excessive current from flowing to the electric vehicle by controlling the charge circuit interrupting device in response to the current sensor. The controller may be constructed and arranged to open the charge circuit interrupting device when the current exceeds a limit for a first predetermined period of time. The controller may be constructed and arranged to close the contactor after a second predetermined period of time. The controller may be constructed and arranged to close the contactor after receiving a manually generated reset input. The controller may be constructed and arranged to implement a trip curve. The overcurrent protection circuit may be constructed and arranged to open the charge circuit interrupting device substantially independently of the controller. The controller may be constructed and arranged to perform a supervisory function for the overcurrent protection circuit. The electric vehicle supply circuit may further include a metering circuit, and the overcurrent protection circuit may be constructed and arranged to operate in response to the metering circuit. The overcurrent protection circuit may operate in response to a current limit set by a manufacturer. The overcurrent protection circuit may be constructed and arranged to operate in response to a current limit that is coordinated with the control pilot signal. The overcurrent protection circuit may be constructed and arranged to operate in response to a current limit input by a user. The electric vehicle supply circuit may further include an alarm constructed and arranged to operate in response to the overcurrent protection circuit.

A method may include supplying electric power to an electric vehicle through an electric vehicle supply circuit that is fed by a branch circuit, monitoring the current flowing to the vehicle through the electric vehicle supply circuit, preventing excessive current from flowing to the electric vehicle by interrupting the flow of power to the electric vehicle if the current flowing to the vehicle exceeds a limit, and setting the limit to prevent the electric vehicle supply circuit from tripping an overcurrent protection device on the branch circuit.

The method may further include coupling the electric vehicle supply circuit to an electric vehicle charging facility, and setting the current limit in response to a parameter of the electric vehicle charging facility. The method may further include activating an alarm if the current flowing to the vehicle exceeds the limit. The method may further include automatically testing the overcurrent protection device.

A system may include an electric vehicle supply circuit having an overcurrent protection feature to interrupt the flow of power from a power source to an electric vehicle if the current flowing to the electric vehicle exceeds a limit, and an interface to input the limit to the electric vehicle supply circuit.

The interface may include a manual user interface and/or an automatic interface. An automatic interface may be constructed and arranged to receive a demand response signal from a utility.

DETAILED DESCRIPTION

For convenience, the term electric vehicle will be used to refer to pure electric vehicles (EVs), plug-in hybrid electric vehicles (PHEVs), and any other type of vehicle that utilizes electric charging.

Electric vehicle supply equipment (EVSE) typically includes an electric vehicle supply circuit. An electric vehicle supply circuit is designed to provide power to an electric vehicle from a power source and includes at least an interrupting device and control circuitry to cause the interrupting device to interrupt the flow of power from the power source to the electric vehicle in response to conditions relevant to electric vehicles. Examples of conditions relevant to electric vehicles include a ground fault condition, an inoperable grounding monitor circuit, the absence of a vehicle connected to the EVSE, absence of a ready signal from the vehicle, etc.

Figure 1:
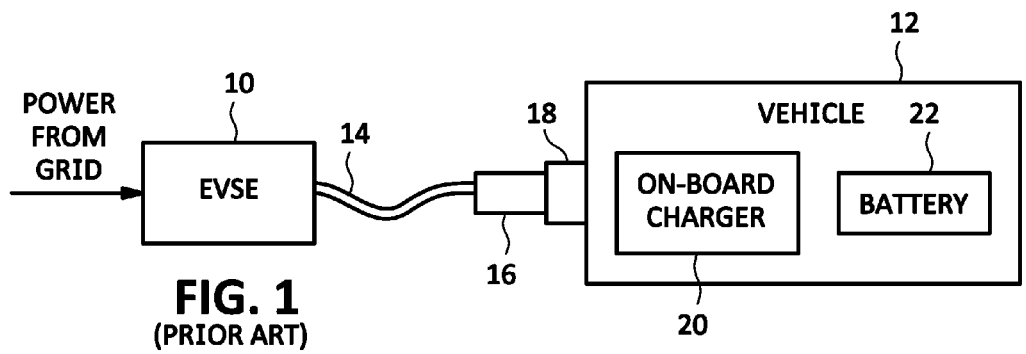
FIG. 1 illustrates a typical arrangement for charging an electric vehicle.
Figure 2:
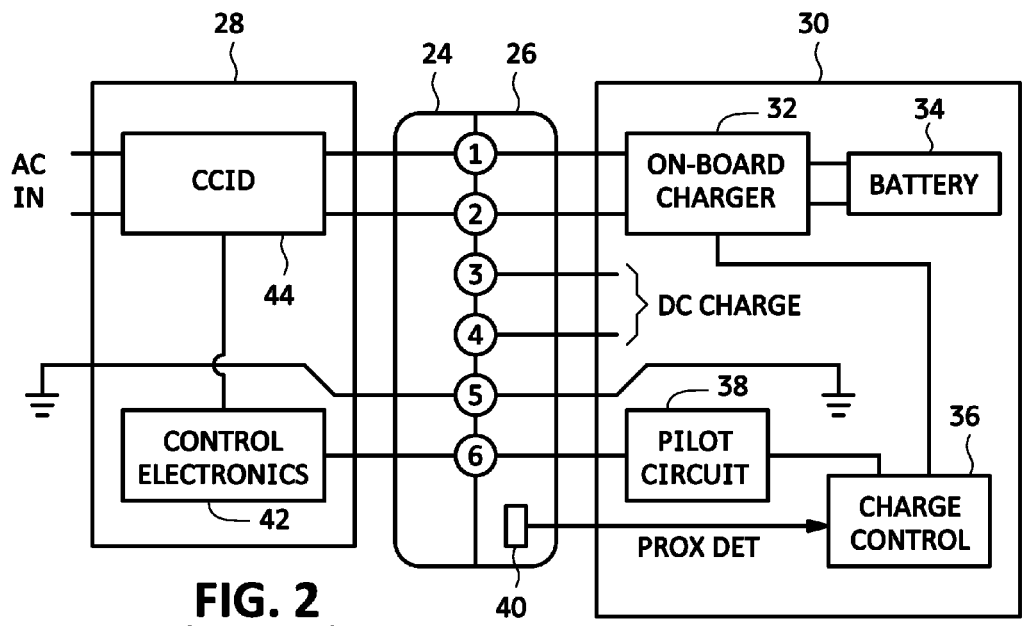
FIG. 2 illustrates a reference design for a conductive vehicle charging system.
Figure 3:
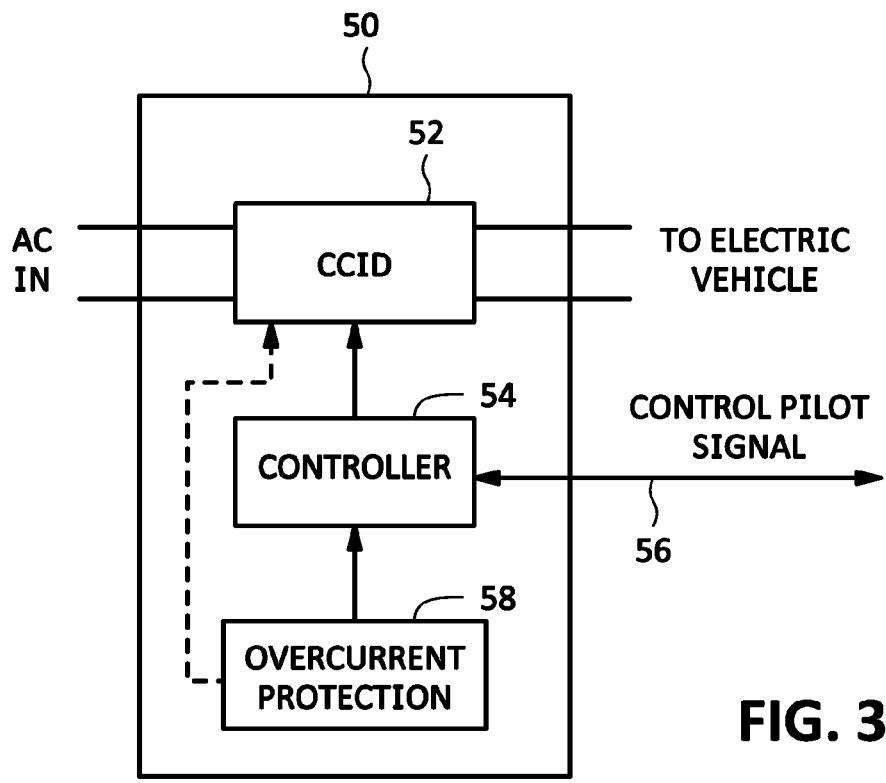
FIG. 3 illustrates an embodiment of an electric vehicle supply circuit according to some inventive principles of this patent disclosure.

FIG. 3 illustrates an embodiment of an electric vehicle supply circuit 50 according to some inventive principles of this patent disclosure. The embodiment of FIG. 3 includes a charge circuit interrupting device (CCID) 52 to interrupt the flow of power from a power source to an electric vehicle, and a controller 54 to control the CCID in response to a control pilot signal 56 from the electric vehicle. An overcurrent protection circuit 58 prevents excessive current from flowing to the electric vehicle.

The overcurrent protection circuit 58 may be implemented in countless different manners. It may be integral with, partially integral with, or separate from the controller 54. For example, in a fully integrated implementation, the overcurrent protection circuit may utilize an existing current sensor coupled to the controller and arranged to measure the current flowing to the electric vehicle. Such a sensor may exist for detecting a ground fault condition. The controller may then include functionality to control the existing CCID in response to the current sensor to prevent excessive current flow. In a partially integrated implementation, the overcurrent protection circuit may utilize a separate, dedicated current sensor to measure the current flowing to the electric vehicle, but then utilize the existing controller and CCID to implement the remaining overcurrent protection functionality. If the EVSE includes a metering circuit, the overcurrent protection functionality in the controller may utilize the output from the metering circuit to measure the current flowing to the electric vehicle.

In another partially integrated implementation, the overcurrent protection circuit may include a current sensor and control circuitry that are completely separate from the controller, but then utilize the existing CCID. In this type of implementation, the overcurrent protection control circuitry may include one or more operational amplifiers (op amps) or an RMS-to-DC converter arranged to drive a comparator in response to the current sensor.

In a completely separate implementation, the current sensor, control circuitry and switching device may all exist, and operate independently of, the existing controller and CCID.

The overcurrent protection circuit may operate in response to a current limit that is set by the manufacturer of the EVSE. Such a limit may be programmed into firmware in a microcontroller, dialed into a potentiometer in an analog circuit, or realized in any other suitable manner. When the current flowing to the vehicle exceeds the limit by a predetermined amount and/or time, it may be interrupted until the overcurrent protection circuit is reset manually or automatically, e.g., after a certain period of time, or in response to a signal from an electric utility or energy management system, etc.

The current limit may also be input manually through a user interface incorporated into the EVSE such as, for example, a touchscreen, a dial, etc., or it may be provided by an energy management system or an electric utility such as through a demand response signal, or input in any other suitable manner.

In some embodiments, the current limit may be coordinated with the current charging capacity of the EVSE as indicated by the control pilot signal. For example, if the EVSE indicates to the electric vehicle through the control pilot signal that it has a 16 amp charging capacity, the limit may be set to a certain percentage above 16 amps in case the on-board charger on the vehicle exceeds the charging capacity of the EVSE as indicated by the control pilot signal.

A user or installer may set the current limit to prevent the electric vehicle supply circuit from tripping an overcurrent protection device on a branch circuit that feeds the EVSE. Thus, if the EVSE is installed on a 15 amp branch circuit, the current limit may be set to 12 amps.

If the EVSE is connected to an electric vehicle charging facility, the current limit may be set in response to a parameter of the charging facility. For example, if the EVSE is implemented as a portable charger, and it is plugged into a public charging station that has a specified maximum output current, the current limit of the EVSE may be set by the user to prevent the EVSE from exceeding the maximum output current of the charging station.

The overcurrent protection circuit may implement an alarm feature that indicates when the flow of current has been or will be interrupted. The alarm may be activated after the current is interrupted, or prior to an impending interruption to so a user may try to take corrective action to avoid the interruption.

Figure 4:
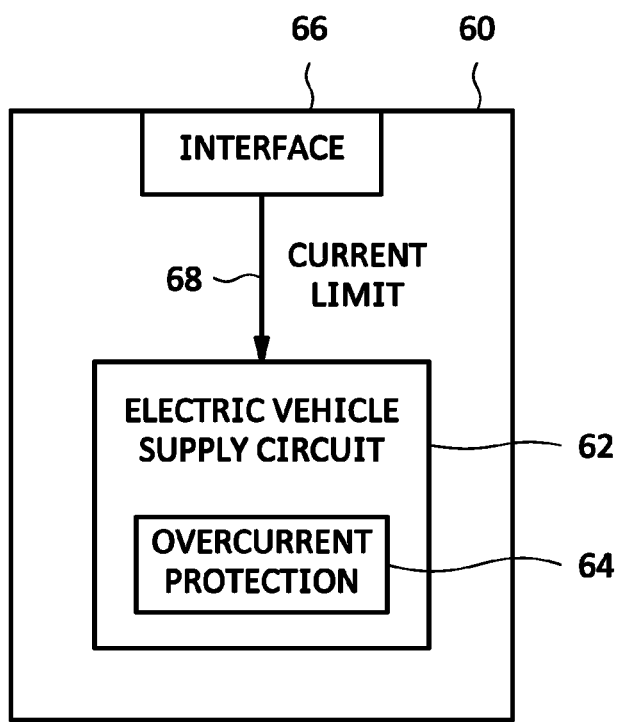
FIG. 4 illustrates an embodiment of an EVSE system according to some inventive principles of this patent disclosure.

FIG. 4 illustrates an embodiment of an EVSE system 60 according to some inventive principles of this patent disclosure. The embodiment of FIG. 4 includes an electric vehicle supply circuit 62 having overcurrent protection functionality 64 to interrupt the flow of power from a power source to an electric vehicle if the current flowing to the electric vehicle exceeds a limit. An interface 66 enables the current limit 68 to be input to the electric vehicle supply circuit 62. The interface 66 may enable a user to manually input one or more current limits, and/or it may enable one or more current limits to be input automatically. For example, the interface 66 may include an IEEE 802.11 (e.g., WiFi) interface to enable a user to input a current limit through a WiFi connection to a notebook computer or smart phone. Alternatively, the interface 66 may include a ZigBee Smart Energy interface to enable a local utility to set a current limit based on time-of-day, demand response, off-peak utility rates, etc. As another example, the interface may include a potentiometer or alphanumeric display with menu-driven up/down buttons to enable a user to input one or more current limits.

The interface 66 may additionally or alternatively enable a reset input to be applied to the electric vehicle supply circuit 62. For example, the interface 66 may include a manual reset pushbutton to enable a user to manually reset the overcurrent protection functionality after it is activated in response to exceeding a current limit. The interface may additionally or alternatively include an overcurrent indicator such as an LED, panel lamp, alphanumeric display, etc. to indicate an overcurrent condition or alarm.

Figure 5:
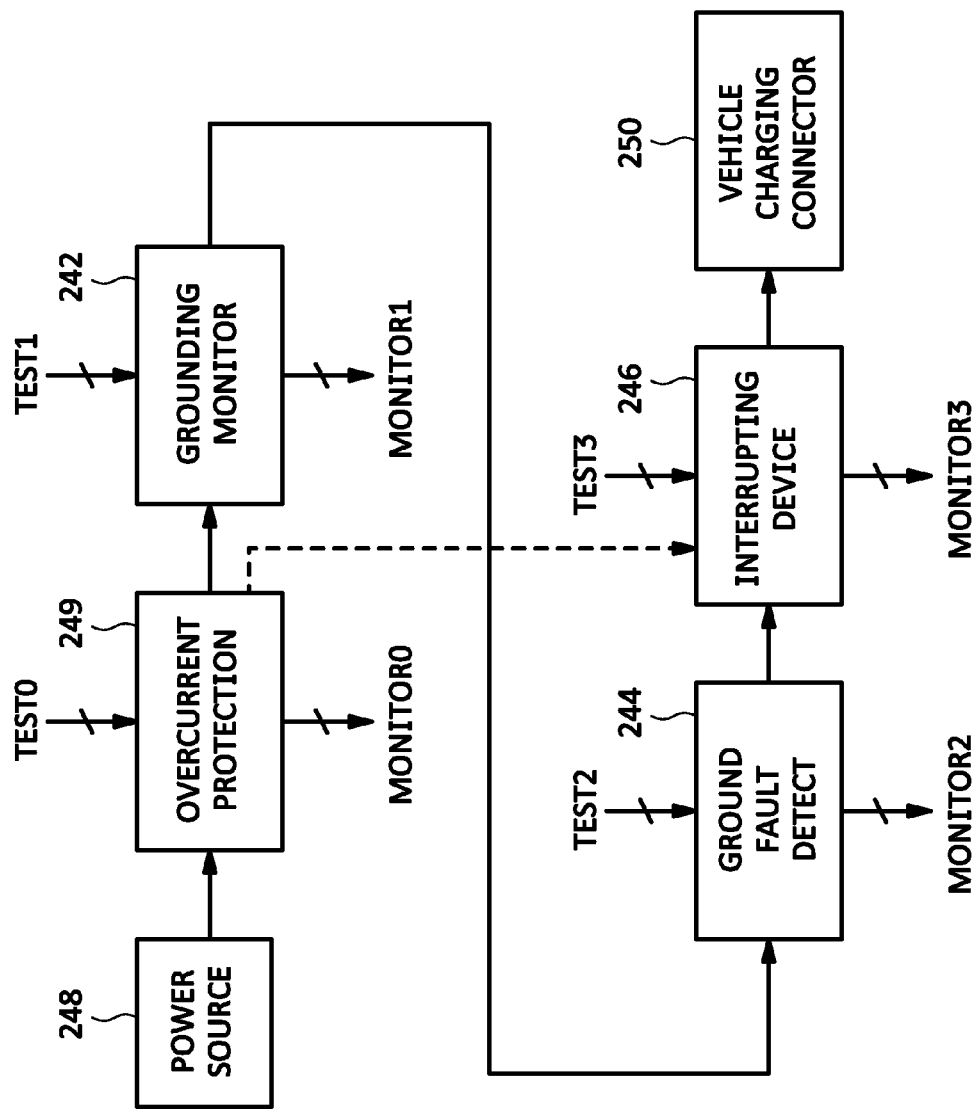
FIG. 5 illustrates an embodiment of an electric vehicle supply circuit according to some inventive principles of this patent disclosure.

FIG. 5 illustrates an embodiment of an electric vehicle supply circuit according to some inventive principles of this patent disclosure. The embodiment of FIG. 5 includes an overcurrent protection circuit 249, a grounding monitor 242, a ground fault detector 244, and an interrupting device 246 arranged along the power path between a power source 248 and a vehicle charging connector 250. The overcurrent protection circuit 249 may include its own current interrupting apparatus, and/or it may utilize the interrupting device 246 to prevent excessive current from flowing to the electric vehicle.

The power path may accommodate AC and/or DC current flow. Any or all of the ground monitor, ground fault detector and/or interrupting device may include one or more test inputs TEST0, TEST1, TEST2, TEST3, respectively, and one or more monitor outputs MONITOR0, MONITOR1, MONITOR2, MONITOR 3, respectively. The test inputs may include any type of analog, digital or hybrid signals for initiating, controlling, resetting, etc., a testing operation. The monitor outputs may include any type of analog, digital or hybrid signals for monitoring, measuring, reporting, etc., a testing operation. Any of the testing and/or monitoring signals may operate manually, automatically, or in any other suitable manner. Not all of the elements are required in every embodiment, and the number, order and arrangement of elements may be changed.

The embodiment illustrated in FIG. 5 may provide a versatile framework for implementing overcurrent protection for an electric vehicle supply circuit adapted to any vehicle charging situation.

For example, it may be used to implement a vehicle charging station under any of the standards currently published or under development such as UL 2231, IEC 61851-22, etc. In the context of UL standards, the ground fault detector 244, and interrupting device 246, taken together, may be used to implement a charging circuit interrupting device (CCID) which is required to disconnect the source of power if the difference between the current flowing in the current-carrying conductors (differential current) exceeds a predetermined threshold. Any differential current is usually assumed to be caused by a ground fault which may present an electrocution hazard. This is essentially the same operating principle as a common ground fault circuit interrupter (GFCI) which is typically designed to interrupt the flow of power (trip) if the differential current exceeds 5 mA. In the case of electric vehicle charging, however, 5 mA may be an unacceptably low trip point. Natural nonhazardous current paths through the vehicle to ground may routinely exceed 5 mA, thereby causing excessive nuisance tripping that interrupts the charging process. Therefore, UL standards allow a CCID to have a trip point of 20 mA if the system is equipped with a grounding monitor that interrupts the power circuit if it detects an inadequate grounding circuit. UL standards also require a CCID to allow for manual testing or automatic testing before each operation.

The UL standards, however, only require interrupting power in response to a differential current. By providing overcurrent protection for non-differential current flow, the inventive principles of this patent disclosure may provide various benefits. For example, EVSE is typically located in a location that is relatively more accessible than the primary overcurrent protection device for the branch circuit that feeds the EVSE. By providing a user interface for this additional level of overcurrent protection at a more accessible location, it may prevent the user from having to locate and actuate the primary overcurrent protection device in the event of an overcurrent event. Moreover, by providing overcurrent protection that is adapted specifically for the EVSE, it may prevent the de-energizing of other loads on the branch circuit feeding the EVSE in the event of an overcurrent event.

Figure 6:
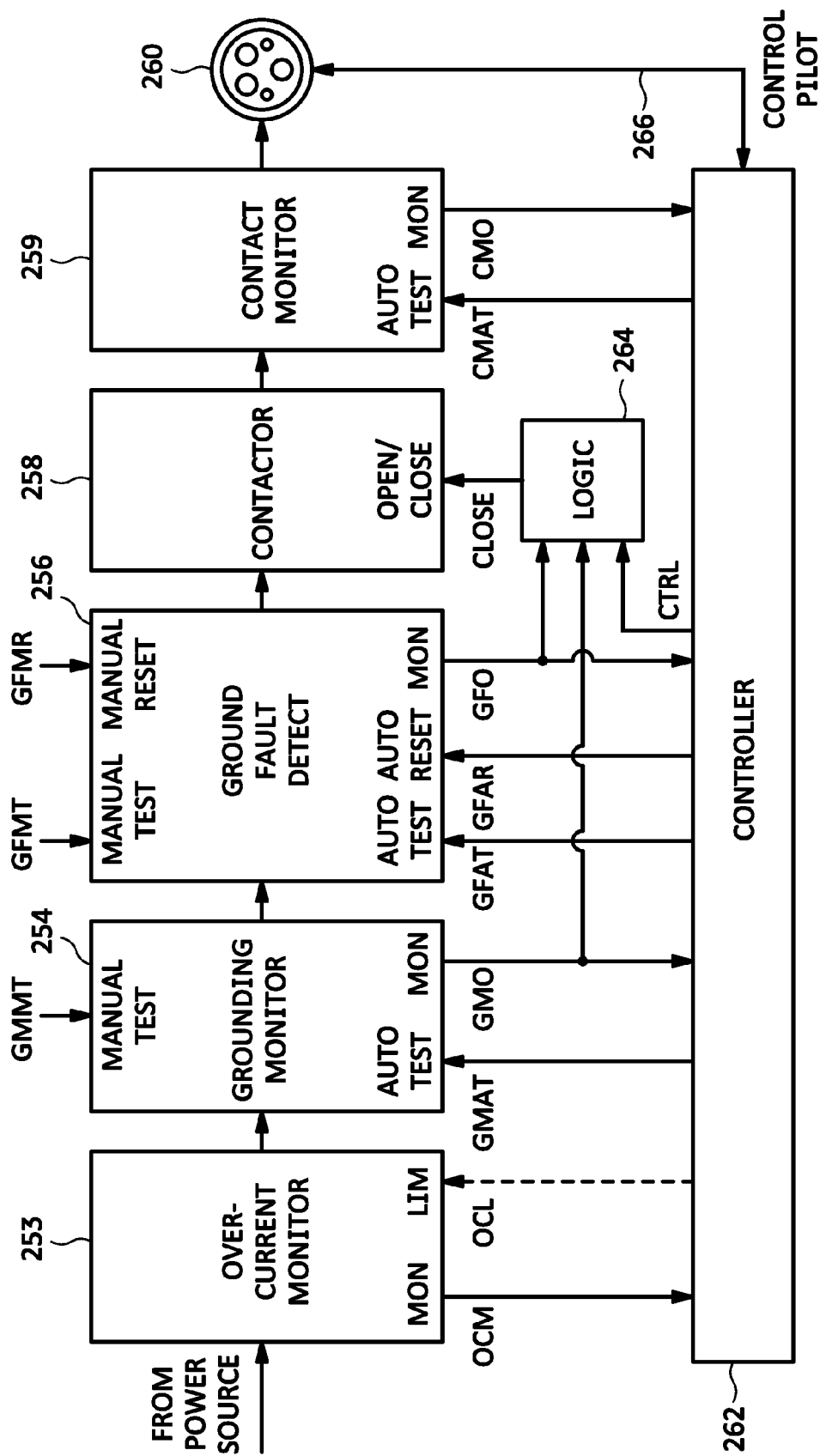
FIG. 6 illustrates another embodiment of an electric vehicle supply circuit according to some inventive principles of this patent disclosure.

FIG. 6 illustrates another embodiment of an electric vehicle supply circuit according to some inventive principles of this patent disclosure. Power is provided by a power source which may include any suitable type of AC and/or DC power source. The power flows through an overcurrent monitor circuit 253, a grounding monitor circuit 254, a ground fault detecting circuit 256, a contactor circuit 258, and a contact monitor circuit 259 on the way to a vehicle charging connector 260. These components may be reordered and/or rearranged in any suitable manner.

The grounding monitor circuit 254 monitors the continuity of a grounding conductor and generates an output signal GMO in response to the state of the grounding conductor. A manual test input GMMT enables the operation of the grounding monitor to be tested manually. An automatic test input GMAT enables the operation of the grounding monitor to be tested in response to an automatic test signal from a controller 262. The output signal GMO is provided to the controller 262 as well as logic 264.

The ground fault detecting circuit 256 monitors the differential current through the current carrying conductors and changes the state of the output signal GFO if the differential current exceeds a threshold. A manual test input GFMT enables the operation of the ground fault detector to be tested manually, while a manual reset input GFMR allows the detector to be reset manually. Automatic test input GFAT and automatic reset input GFAR enable the controller 262 to test and reset the ground fault detector. The output signal GFO is applied to the controller 262 as well as logic 264.

The contactor circuit 258 is arranged to close the circuit between the power source and the vehicle connector 260 in response to a CLOSE input signal from logic 264.

The contact monitor circuit generates an output signal CMO in response to the state of one or more switches in the contactor circuit 258. An automatic test input CMAT enables the controller 262 to test and monitor the contactor circuit.

A control pilot connection 266 enables the controller to determine whether a vehicle is connected to the supply circuit, to determine whether the vehicle is ready to receive power, to communicate the current capacity of the supply circuit to the vehicle, etc.

Logic 264 may be configured for interlocking operation. For example, the logic may be configured to assert the CLOSE signal only if the GMO signal indicates that the grounding monitor circuit is operating properly, the GFO signal indicates that no ground fault is present, and the controller asserts the CTRL signal.

The overcurrent monitor circuit 253 includes a sensor for measuring the current flowing through the electric vehicle supply circuit. It generates an overcurrent monitor signal OCM in response to the measured current flow. The overcurrent monitor signal OCM may be implemented in many different forms according to the inventive principles of this patent disclosure.

For example, the OCM signal may be an analog signal that provides an indication of the actual amount of current flowing to the vehicle. As an analog signal, OCM may be read by an A/D converter in the controller 262 which then controls the contactor circuit 258 to prevent excessive current from flowing through the electric vehicle supply circuit and to the vehicle. Any suitable signal processing may be implemented in the overcurrent monitor circuit 253, the controller 262, or both. For example, the overcurrent monitor circuit 253 may be configured to generate the OCM signal to provide an analog measure of the, average, RMS, etc., value of the current flowing to the vehicle. Alternatively, the overcurrent monitor circuit 253 may be configured to generate the OCM signal to provide an analog measure of the instantaneous value of the current from flowing through the electric vehicle supply circuit, and the controller 262 may calculate the average, RMS, etc., value of the current.

The controller may then compare the analog value of the OCM signal, regardless of how it has been processed, to a limit for purposes of controlling the contactor circuit 258 to prevent excessive current flow. For example, the controller 262 may open the contactor whenever the current exceeds the limit for a first predetermined period of time, then reset itself and close the contactor after a second predetermined period of time, or after receiving a manually generated reset input. As another example, the controller 262 may implement any suitable trip curve similar to a circuit breaker where the amount current required to open the contactor decreases as the amount of time the current exceeds the limit increases.

Alternatively, overcurrent monitor signal OCM may be implemented as a binary signal that indicates whether the current flowing through the electric vehicle supply circuit exceeds a limit. In such an implementation, the limit may be hard-wired into the overcurrent monitor circuit 253, it may be provided through any suitable interface, or it may be provided as an overcurrent limit signal OCL by the controller 262 as shown with the broken line in FIG. 6. The controller 262 may then be configured to open the contactor whenever the binary OCM signal is active for a first predetermined period of time, then reset itself and close the contactor using any suitable reset scheme.

The controller 262 may also be configured to operate any or all of the other features illustrated in FIG. 6. For example, the controller may be configured to automatically test the grounding monitor 254, the ground fault detector 256 and/or the contactor circuit 258 and contact monitor 259 at power-up, each time power is applied to the vehicle, periodically while power is being supplied to the vehicle, etc. The contact monitor circuit enables the controller to monitor the presence of power to determine that the switch or switches in the contactor circuit 258 have actually closed when the CLOSE signal is activated and have actually opened when the CLOSE signal is deactivated and to provide a warning or take other suitable action if the actual state of the contactor circuit is incorrect or if some other fault causes the output power to be in an incorrect state.

Figure 7:
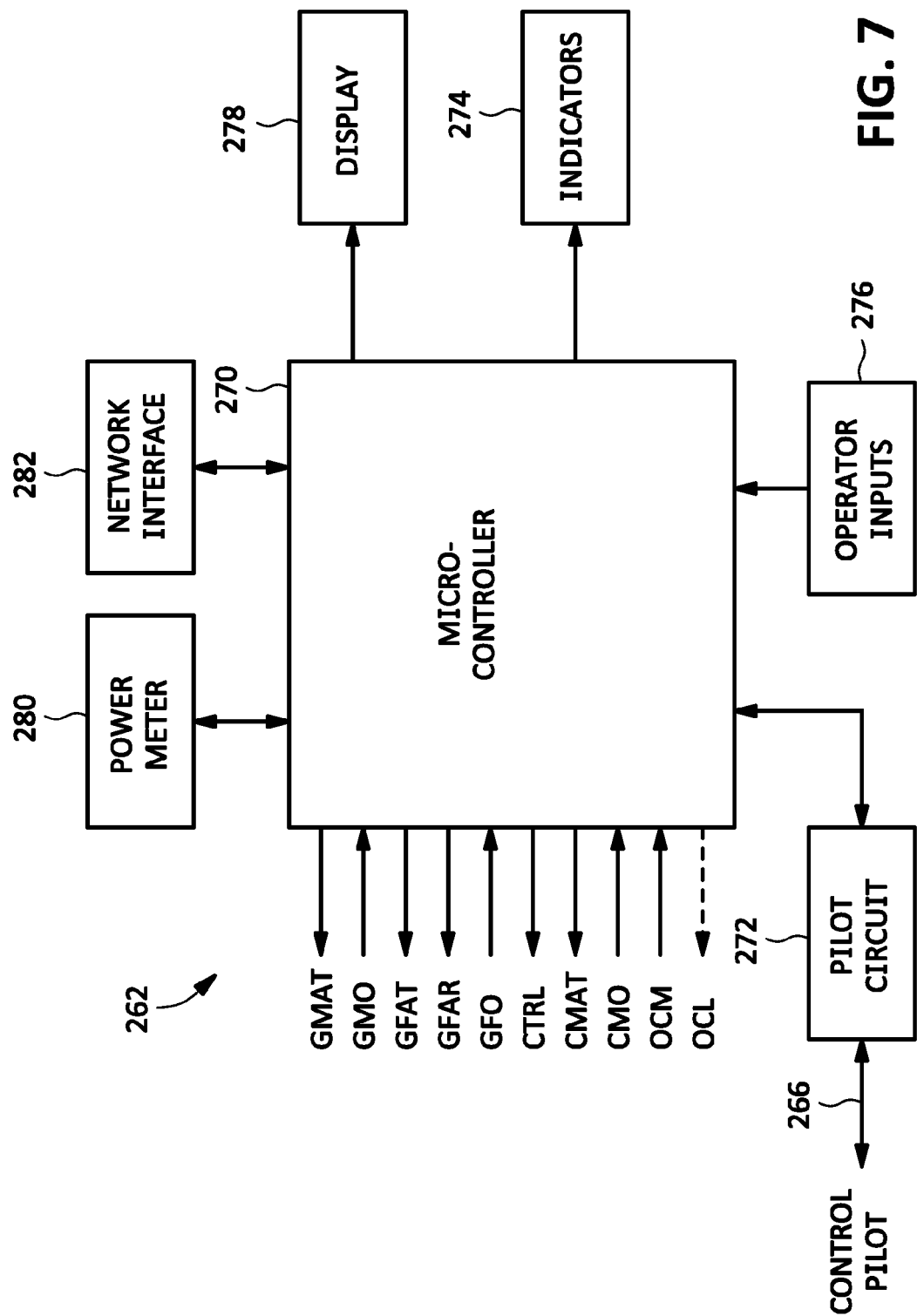
FIG. 7 illustrates an embodiment of a controller according to some inventive principles of this patent disclosure.

FIG. 7 illustrates an embodiment of a controller suitable for use as the controller 262 shown in FIG. 6 according to some inventive principles of this patent disclosure. The controller 262 is based on a microcontroller 270, although some or all of the functions of the controller may be implemented with any other suitable analog and/or digital hardware, software, firmware, etc., or any combination thereof. Not all of the elements shown in FIG. 7 are required in every embodiment, and the number, order and arrangement of elements may be changed.

The microcontroller 270 includes digital I/O lines coupled to the test, monitor and reset signals shown in FIG. 6. The controller may include filters, surge suppressors, buffers, amplifiers, comparators, level shifters, level detectors, additional logic, etc., to process these signals on their way to and from the microcontroller. A pilot circuit 272 provides functionality to enable the controller to determine whether a vehicle is connected to the supply circuit, to determine whether the vehicle is ready to receive power, to communicate the current capacity of the supply circuit to the vehicle, to monitor the integrity of the grounding connection, etc., through the control pilot connection 266.

Indicators 274 such as LEDs, lamps, etc. enable the controller to provide a visual indication of the operating condition of the vehicle supply circuit, fault conditions, etc. Some example indicators include a vehicle charging indicator and an EVSE fault indicator such as an overcurrent condition and/or alarm.

Operator inputs 276 such as switches, keypads, swipe cards, RFID devices, etc., enable a user to control the operation of the vehicle supply circuit. Some example inputs include switches to start/stop charging, switches to increase/ decrease amperage, a reset input for an overcurrent condition, one or more current limits for the overcurrent protection functionality, etc.

A display 278 enables the controller to provide more information to a user than may be conveyed through simple indicators. For example, an alphanumeric display may display vehicle charging current, voltage and/or power, percentage of charging completed, elapsed charging time, cost of power, etc. A display may also provide more detailed information about fault conditions and/or instructions for correcting faults such as an overcurrent condition and/or alarm.

A power meter 280 or other device may provide functionality to measure the amount of power transferred through the vehicle supply circuit, obtain authorization for power usage from a utility or other provider, facilitate off-peak rate reductions and/or demand response functions, detect an overcurrent condition, etc. The power meter may be utility-grade for billing purposes, or it may be a convenience feature. It may be integral with the controller or separate from the controller, for example, in a tamper-proof enclosure. The power meter may be implemented, for example, with a dedicated integrated circuit (IC) such as a Microchip MCP3909 which may be mounted on a main circuit board with the microcontroller 270. Alternatively, the power meter may be arranged on a separate circuit board that may be attached to the main circuit board through a plug-in header to facilitate implementation of the power meter as an optional feature. If the power meter 280 is used for overcurrent protection, the overcurrent protection circuit 253 may be eliminated from the embodiment of FIG. 6, along with the OCM and/or OCL signals.

A network interface 282 may enable the controller to interface to any suitable network such as a local area network (LAN), wide area network (WAN), home network, the Internet, a control area network (CAN) or other industrial type control network, etc., through any type of network media and using any type of network protocol. Examples include dedicated wires, power line modulation, radio frequency (RF), infrared (IR), and other types of media, Internet Protocol (IP), WiFi, LonWorks, ZigBee, Z Wave, and other types of protocols.

Figure 8:
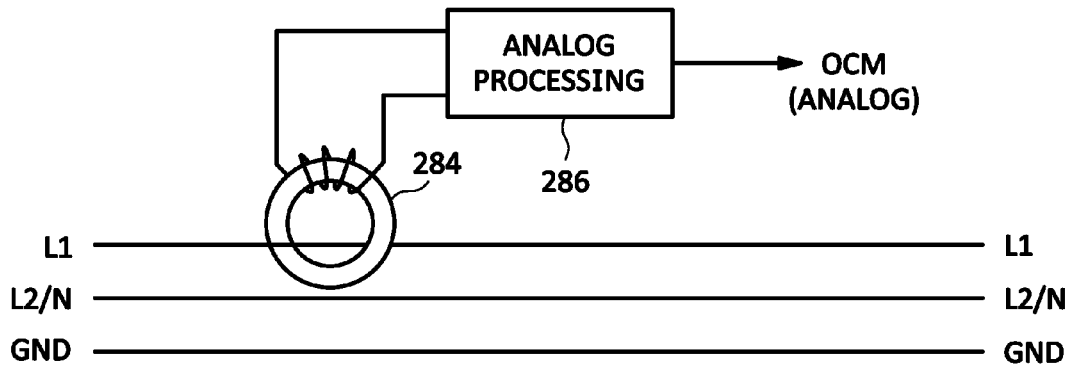
FIG. 8 illustrates a first exemplary embodiment of an overcurrent protection circuit according to some inventive principles of this patent disclosure.

FIG. 8 illustrates a first exemplary embodiment of an overcurrent protection circuit according to some inventive principles of this patent disclosure in which the overcurrent monitor signal OCM is implemented as an analog signal. In this embodiment, the current sensor 284 is a torroidal current transformer which may provide the benefit of galvanic isolation, direct current measurement, and reduced heat build-up, but other types of current sensors may be used including a series resistor, a Hall-effect sensor, etc.

An analog processing circuit 286 includes any suitable circuitry including rectifiers, op amps, etc., to generate the overcurrent monitor signal OCM as an analog signal suitable for reading by an A/D converter on the microcontroller 270 in FIG. 7. The analog processing circuit 286 may also include additional signal processing circuitry to take the average, RMS, peak or other value of the current detected by the current transformer 284.

Figure 9:
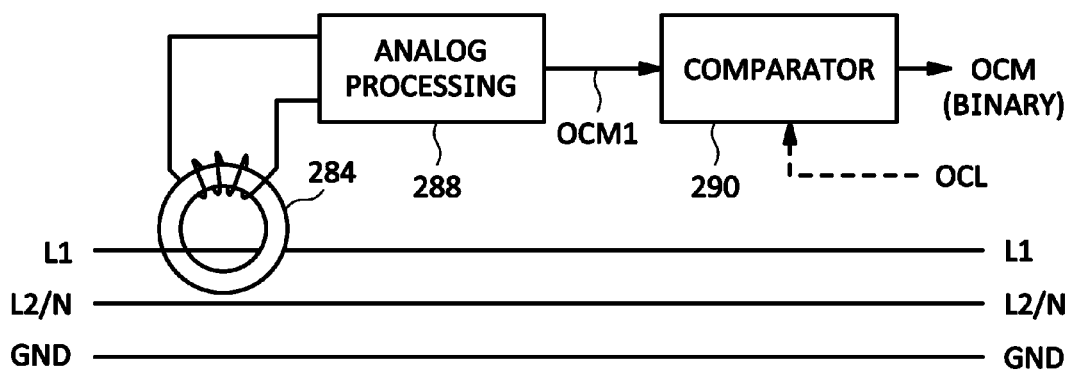
FIG. 9 illustrates a second exemplary embodiment of an overcurrent protection circuit according to some inventive principles of this patent disclosure.

FIG. 9 illustrates a second exemplary embodiment of an overcurrent protection circuit according to some inventive principles of this patent disclosure in which the overcurrent monitor signal OCM is implemented as a binary signal. As with the embodiment of FIG. 8, the current sensor 284 is a torroidal current transformer, but could be any other type of current sensor. Likewise, analog processing circuit 286 includes any suitable circuitry including rectifiers, op amps, etc., to generate an analog signal OCM1, and may include any additional signal processing circuitry to take the average, RMS, peak or other value of the current detected by the current transformer 284. A comparator 290, which may be implemented as a single-limit comparator, window comparator, etc., compares the value of OCM1 to one or more limits which may be hard-wired into the overcurrent monitor circuit, may be provided through any suitable interface, or may be provided as one or more overcurrent limit signals OCL by the controller 262 as shown with the broken line in FIG. 9. The overcurrent monitor signal OCM is then provided as a binary signal suitable for reading as a digital input to the microcontroller 270 in FIG. 7.

Figure 10:
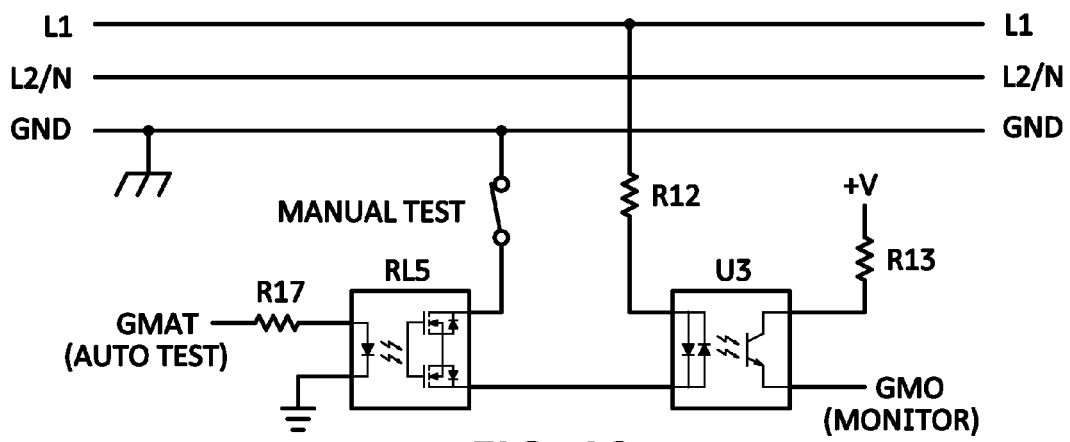
FIG. 10 illustrates an exemplary embodiment of a ground monitor circuit according to some inventive principles of this patent disclosure.

FIG. 10 illustrates an exemplary embodiment of a ground monitor circuit according to some inventive principles of this patent disclosure. In the embodiment of FIG. 10, conductors L1, L2/N and GND are shown passing through the circuit to help visualize the manner in which the circuit of FIG. 10 may be integrated with other circuits to create a complete system. The inventive principles, however, are not limited to these specific details.

In a 120 VAC system, L1, N and GND may designate the hot, neutral and grounding conductors, respectively. In a 240 VAC system, L1, L2 and GND may designate the two hot conductors and the grounding conductor, respectively. Other systems, for example 3-phase power systems, may include different combinations of live and grounding conductors.

In the circuit of FIG. 10, a monitor current path is established beginning with L1 and continuing through resistor R12, optocoupler U3, normally-closed solid state relay RL5, a normally closed manual test switch, and ending at the grounding conductor GND. During normal operation, if the grounding conductor GND remains electrically connected to ground potential, current flowing through the input side of optocoupler U3 turns on a phototransistor which pulls the ground monitor output signal GMO to a high logic level referenced to a logic supply voltage +V and an associated logic ground. This signal may be monitored by a controller to confirm that the grounding conductor GND is properly grounded. The monitor signal GMO may also be used by other logic circuitry to control the state of an interrupter circuit as illustrated in FIG. 6. Additional circuitry may be included between the GMO terminal and the controller such as voltage clamps, filters, resistive dividers, buffers, level detectors, etc.

Actuating the manual test switch interrupts the monitor current path and causes the optocoupler to stop pulling up the monitor signal GMO. The controller or other decision making circuit may respond to the change of state of GMO by interrupting the flow of power to a vehicle and/or any other suitable actions.

The solid state relay RL5 enables the ground monitor circuit to be tested automatically by a controller or any other suitable apparatus. A logic high on the automatic test signal GMAT turns the switch side of RL5 off, thereby interrupting the monitor current path and causing the optocoupler to stop pulling up the monitor signal GMO. This enables the controller to confirm the correct operation of the ground monitor circuit. In this case, rather than actuating a CCID, the controller may drive GMAT low again, and after confirming that GMO goes high again, return to a normal monitoring mode of operation.

Figure 11:
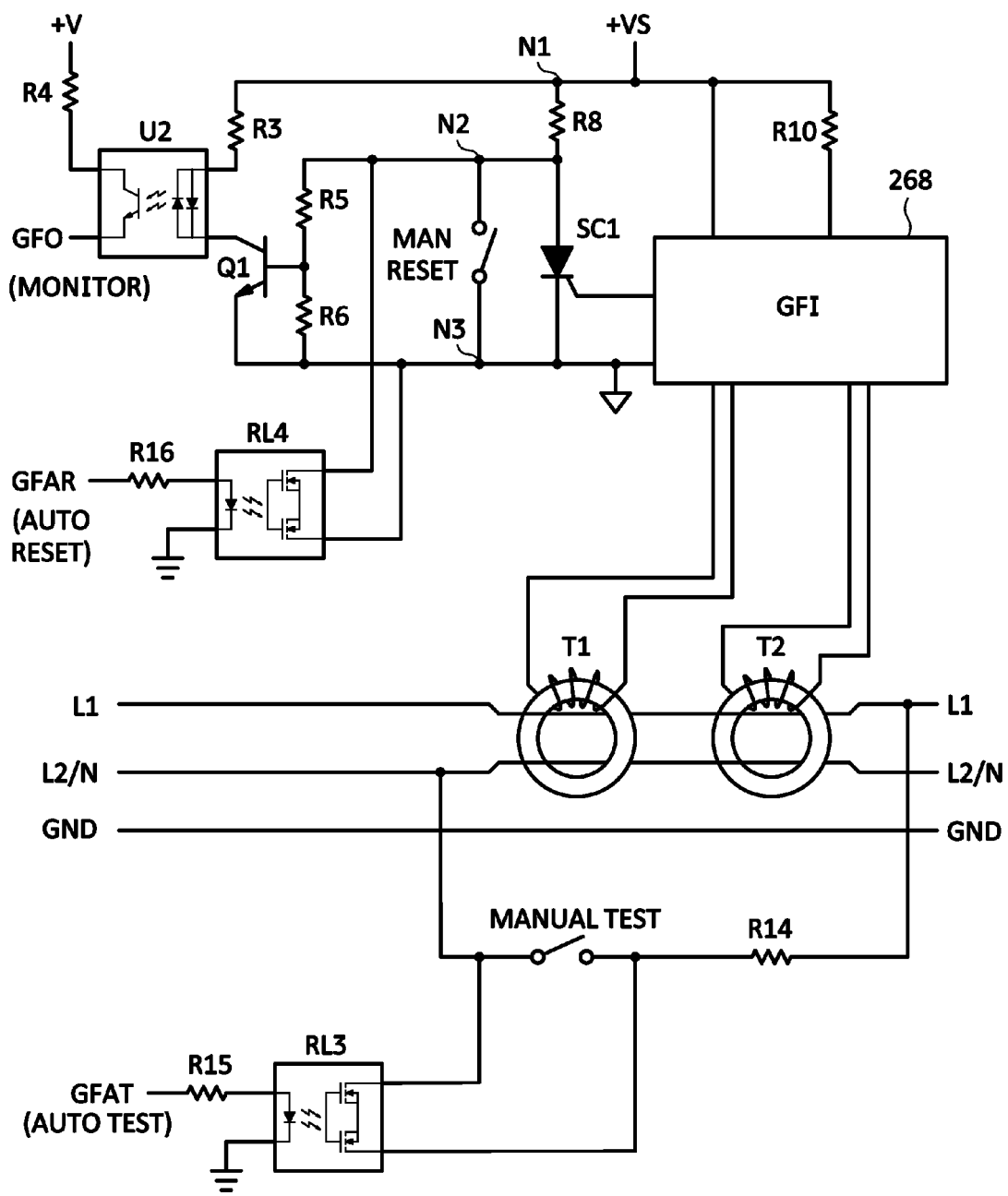
FIG. 11 illustrates an exemplary embodiment of a ground fault detection circuit according to some inventive principles of this patent disclosure.

FIG. 11 illustrates an exemplary embodiment of a ground fault detection circuit according to some inventive principles of this patent disclosure. In the embodiment of FIG. 11, conductors L1, L2/N and GND are again shown passing through the circuit to help visualize the manner in which circuit of FIG. 11 may be integrated with other circuits, but the inventive principles are not limited to these specific details.

The current carrying conductors L1 and L2/N both pass through a differential transformer T1 and neutral-ground (N-G) transformer T2, which are connected to a ground fault interrupter (GFI) circuit 268. The GFI circuit includes circuitry to detect differential currents flowing through L1 and L2/N and trigger the silicon controlled rectifier (SCR) labeled SC1 when the differential current exceeds a threshold determined by resistor R10. The GFI may be based on a commercial or special-purpose GFCI integrated circuit such as the LM1851 chip from National Semiconductor or the FAN1851 chip from Fairchild.

In a conventional ground fault detection circuit, the SCR actuates a latching relay arrangement. In the embodiment of FIG. 11, transistor Q1 is normally driven on by resistors R8, R5 and R6. When Q1 is on, a current set by R3 flows from the GFI supply +VS through the input side of optocoupler U2 which causes the phototransistor on the output of U2 to pull the ground fault monitor output GFO high through R4. The monitor signal GFO may then be used by a controller and/or logic circuitry to control the state of a contactor, relay or other interrupting circuit, and to perform reporting and/or other suitable actions in response to a ground fault detection.

When SC1 is triggered in response to a ground fault detection, it latches in the conductive state and causes Q1 to turn off, thereby causing the ground fault monitor signal GFO to go low. SC1 may be reset by closing the manual reset switch. A normally-open solid state relay RL4 enables the GFI circuit to be reset automatically by a controller and/or other decision making circuit or suitable apparatus in response to a ground fault automatic reset signal GFAR. A logic high on GFAR turns on the LED on the input side of RL4 through a current limiting resistor R16. Light from the LED turns on the FET switches on the output side of RL4, thereby resetting SC1.

The circuit of FIG. 11 may be tested by closing the manual test switch which shunts a current from L1 to L2/N without passing through the transformers T1 and T2, thereby simulating a ground fault condition. The amount of test current is determined by the value of resistor R14.

Another normally-open solid state relay RL3 enables the GFI circuit to be tested automatically by a controller and/or other decision making circuit or suitable apparatus by driving the ground fault automatic test signal GFAT with a logic high. A high signal on GFAT turns on the LED on the input side of RL3 through a current limiting resistor R15. Light from the LED turns on the FET switches on the output side of RL3, thereby causing a test current to flow through R14 without passing through the transformers T1 and T2.

The GFI supply +VS is referenced to a local ground connection at node N3 and may be provided, for example, by a rectifier bridge connected to the current carrying conductors L1 and L2/N. One or more resistors may be connected in series with the bridge to reduce the supply voltage to an acceptable level for the GFI circuit 268. For example, commonly available GFCI chips such as the LM1851 typically include an internal voltage regulator that clamps the supply voltage to about 26 Volts.

Figure 12:
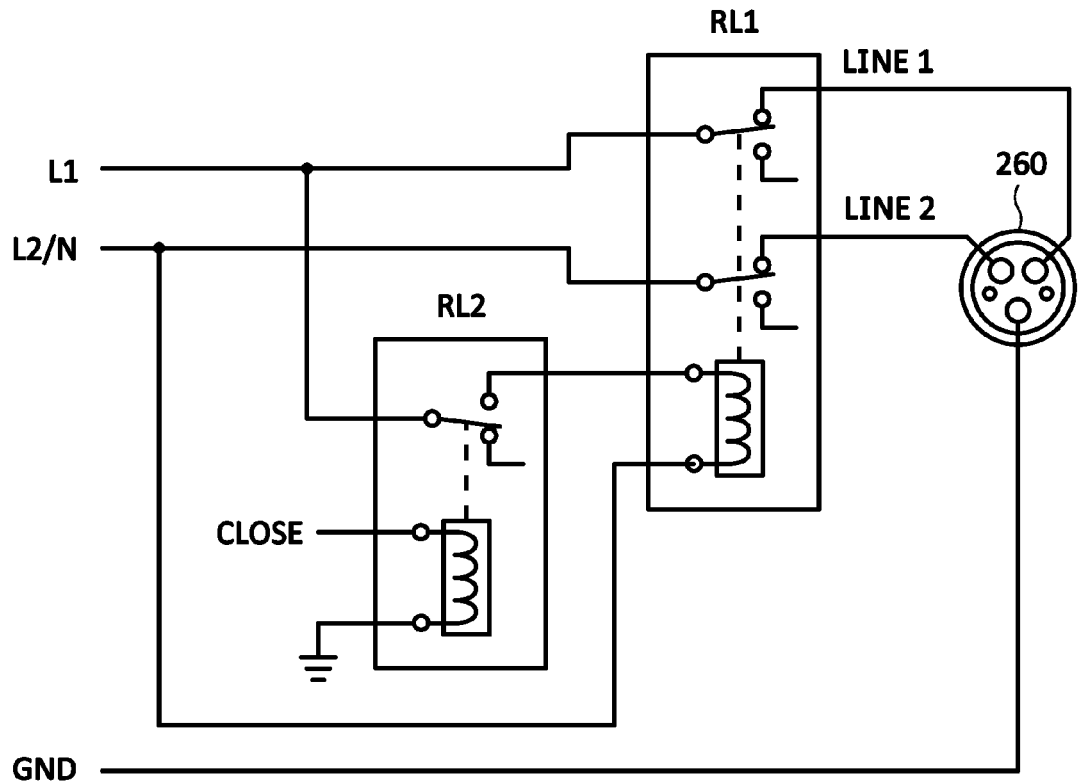
FIG. 12 illustrates an exemplary embodiment of a contactor circuit according to some inventive principles of this patent disclosure.

FIG. 12 illustrates an exemplary embodiment of a contactor circuit according to some inventive principles of this patent disclosure. The embodiment of FIG. 12 includes a pilot relay RL2 to enable a low power logic signal CLOSE to operate a main relay RL1 which carries the fully AC charging current. The normally closed contacts of main relay RL1 are wired between the current carrying supply conductors L1 and L2/N and conductors LINE 1 and LINE 2 which transfer the AC power to a vehicle charging connector 260. The coil of RL1 is wired to the supply conductors through the normally closed contacts of the pilot relay RL2. Thus, when the CLOSE signal is low, current flows through RL2 and energizes the coil of RL1, thereby opening the normally closed contacts of RL1 and de-energizing the vehicle charging connector. When CLOSE goes high, the normally closed contacts of RL2 open and de-energize the coil of RL1, thereby closing the normally closed contacts of RL1 and energizing the vehicle charging connector.

Figure 13:
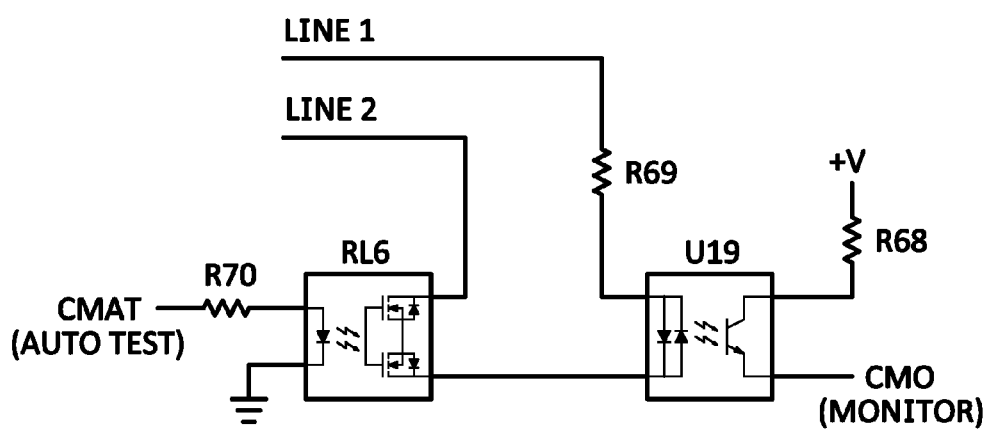
FIG. 13 illustrates an exemplary embodiment of a contact monitor circuit according to some inventive principles of this patent disclosure.

FIG. 13 illustrates an exemplary embodiment of a contact monitor circuit according to some inventive principles of this patent disclosure. In the circuit of FIG. 13, a monitor current path is established beginning at conductor LINE 1 and continuing through resistor R69, optocoupler U19, normally-closed solid state relay RL6, and ending at conductor LINE 2. The monitor circuit of FIG. 13 may be used, for example, to monitor the state of an EVSE main relay or contactor such as that illustrated in FIG. 12.

During normal operation, if the contacts of the monitored relay are closed and AC power is available, current flowing through the input side of optocoupler U19 turns on a phototransistor which pulls the contact monitor output signal CMO to a high logic level through resistor R68 referenced to a logic supply voltage +V and an associated logic ground. If the contacts are open and/or AC power is not available, no current flows through the monitor current path and the optocoupler stops pulling up the monitor signal CMO. The CMO signal may be monitored by a controller or other apparatus to confirm that the contacts are actually open or closed when expected.

The normally-closed solid state relay RL6 provides additional functionality by enabling an automatic test feature. During a time when AC power is expected on LINE 1 and LINE 2, the contact monitor automatic test signal CMAT may be driven high to turn the switch side of RL6 off, thereby interrupting the monitor current path and causing the optocoupler U19 to stop pulling up the monitor signal CMO. This enables a controller or other apparatus to confirm the correct operation of the contact monitor circuit.

In any of the embodiments of FIGS. 10-13, additional circuitry may be included between the monitor and/or test terminals and the controller and/or other apparatus such as voltage clamps, filters, resistive dividers, buffers, level detectors, etc.

Figure 14:
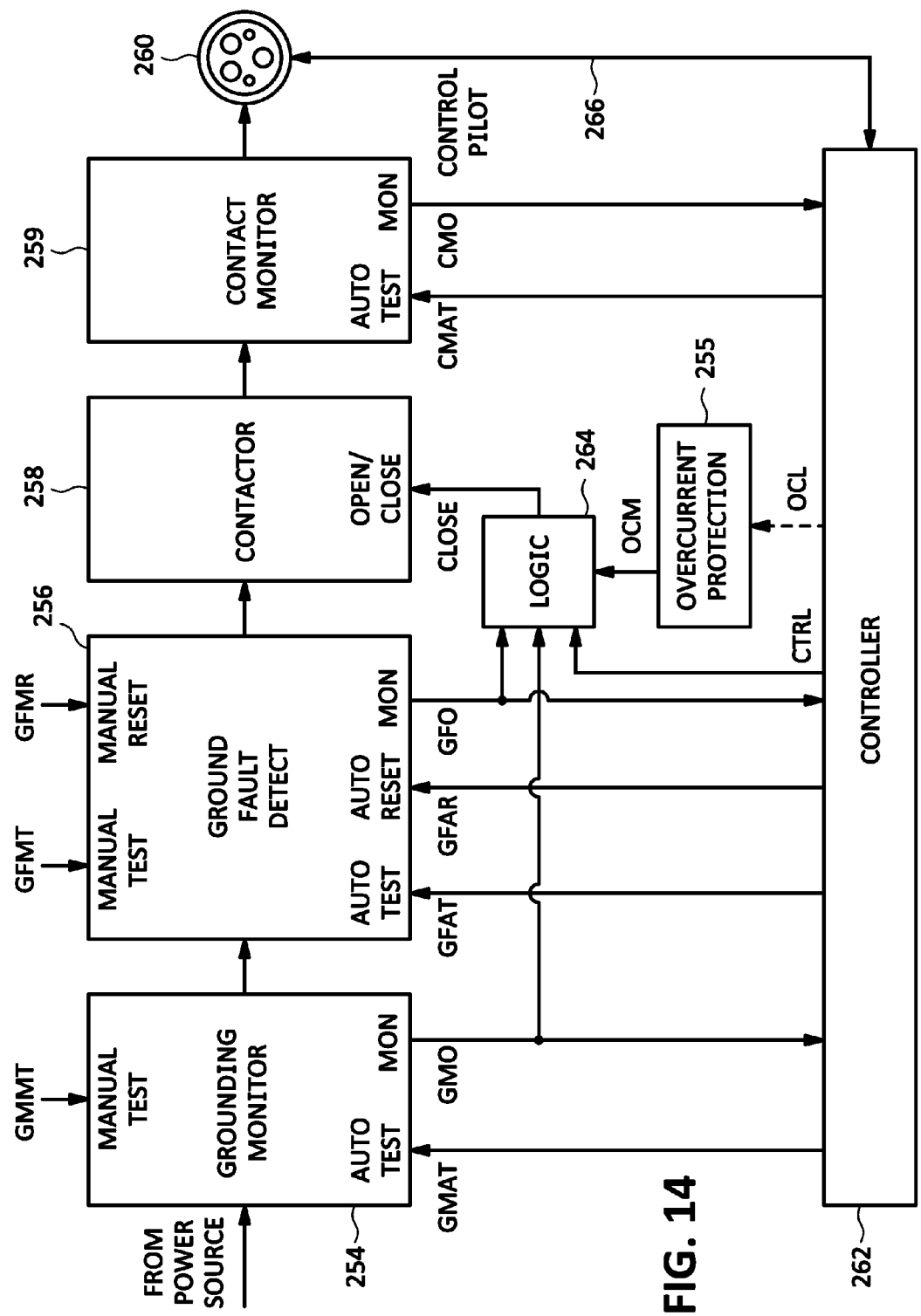
FIG. 14 illustrates another embodiment of an electric vehicle supply circuit according to some inventive principles of this patent disclosure.

FIG. 14 illustrates another embodiment of an electric vehicle supply circuit according to some inventive principles of this patent disclosure. The embodiment of FIG. 14 is similar to that of FIG. 6, but the overcurrent monitor signal OCM from the overcurrent protection circuit 255 is arranged to control the contactor 258 directly through logic 264, thereby eliminating the controller 262 from the direct overcurrent protection path. In this embodiment, the overcurrent monitor signal OCM is implemented as a binary signal such as that generated by the embodiment of FIG. 9. The controller 262 may still perform a supervisory function such as providing one or more overcurrent limit signals OCL to the overcurrent protection circuit, but the overcurrent protection is essentially independent of the controller 262.

The inventive principles of this patent disclosure have been described above with reference to some specific exemplary embodiments, but these embodiments can be modified in arrangement and detail without departing from the inventive concepts. Thus, any changes and modifications are considered to fall within the scope of the following claims.

The invention claimed is:

1. An electric vehicle supply circuit comprising:
a charge circuit interrupting device to interrupt a flow of current from a power source to an electric vehicle;
a controller coupled to the charge circuit interrupting device, where the controller is constructed and arranged to control the charge circuit interrupting device in response to a control pilot signal from the electric vehicle; and
an overcurrent protection circuit including a current sensor coupled to the controller, the controller constructed and arranged to prevent excessive current from flowing to the electric vehicle by controlling the charge circuit interrupting device in response to the current sensor.

2. The electric vehicle supply circuit of claim 1 where the controller is constructed and arranged to open the charge circuit interrupting device when the current exceeds a limit for a first predetermined period of time.

3. The electric vehicle supply circuit of claim 2 where the controller is constructed and arranged to close the contactor after a second predetermined period of time.

4. The electric vehicle supply circuit of claim 2 where the controller is constructed and arranged to close the contactor after receiving a manually generated reset input.

5. The electric vehicle supply circuit of claim 1 where the controller is constructed and arranged to implement a trip curve.

6. The electric vehicle supply circuit of claim 1 where the overcurrent protection circuit is constructed and arranged to open the charge circuit interrupting device substantially independently of the controller.

7. The electric vehicle supply circuit of claim 6 where the controller is constructed and arranged to perform a supervisory function for the overcurrent protection circuit.

8. The electric vehicle supply circuit of claim 1 where the overcurrent protection circuit operates in response to a current limit set by a manufacturer.

9. The electric vehicle supply circuit of claim 1 where the overcurrent protection circuit is constructed and arranged to operate in response to a current limit that is coordinated with the control pilot signal.

10. The electric vehicle supply circuit of claim 1 where the overcurrent protection circuit is constructed and arranged to operate in response to a current limit input by a user.

11. The electric vehicle supply circuit of claim 1 further comprising an alarm constructed and arranged to operate in response to the overcurrent protection circuit.

12. A method comprising:
supplying electric power to an electric vehicle through an electric vehicle supply circuit that is fed by a branch circuit;
monitoring the current flowing to the vehicle through the electric vehicle supply circuit using a current sensor;
preventing excessive current from flowing to the electric vehicle by interrupting the flow of current to the electric vehicle if the current flowing to the vehicle exceeds a limit as detected by the current sensor; and
setting the limit to prevent the electric vehicle supply circuit from tripping an overcurrent protection device on the branch circuit.

13. The method of claim 12 further comprising:
coupling the electric vehicle supply circuit to an electric vehicle charging facility; and
setting the current limit in response to a parameter of the electric vehicle charging facility.

14. The method of claim 12 further comprising activating an alarm if the current flowing to the vehicle exceeds the limit.

15. The method of claim 12 further comprising automatically testing the overcurrent protection device.

16. A system comprising:
an electric vehicle supply circuit having an overcurrent protection feature to interrupt the flow of current from a power source to an electric vehicle if the current flowing to the electric vehicle exceeds a limit; and
an interface to input the limit to the electric vehicle supply circuit.

17. The system of claim 16 where the interface comprises a manual user interface.

18. The system of claim 16 where the interface comprises an automatic interface.

19. The system of claim 18 where the automatic interface is constructed and arranged to receive a demand response signal from a utility.

20. An electric vehicle supply circuit comprising:
a charge circuit interrupting device to interrupt a flow of current from a power source to an electric vehicle;
a controller coupled to the charge circuit interrupting device, where the controller is constructed and arranged to control the charge circuit interrupting device in response to a control pilot signal from the electric vehicle;
a metering circuit; and
an overcurrent protection circuit constructed and arranged to prevent excessive current from flowing to the electric vehicle, where the overcurrent protection circuit is constructed and arranged to operate in response to the metering circuit.

21. An electric vehicle supply circuit comprising:
a charge circuit interrupting device to interrupt a flow of current from a power source to an electric vehicle;
a controller coupled to the charge circuit interrupting device, where the controller is constructed and arranged to control the charge circuit interrupting device in response to a control pilot signal from the electric vehicle; and
an overcurrent protection circuit constructed and arranged to prevent excessive current from flowing to the electric vehicle, the overcurrent protection circuit constructed and arranged to open the charge circuit interrupting device substantially independently of the controller.

22. An electric vehicle supply equipment comprising:
an enclosure including:
an electric vehicle supply circuit for providing a flow of current to an electric vehicle from a power source;
a charge circuit interrupting device located in the enclosure, the charge circuit interrupting device interrupting the flow of current from the power source to the electric vehicle;
a controller located in the enclosure, the controller being coupled to the charge circuit interrupting device, where the controller is constructed and arranged to control the charge circuit interrupting device; and
an overcurrent protection circuit located in the enclosure, the overcurrent protection circuit including a current sensor coupled to the controller, the controller constructed and arranged to prevent excessive current from flowing to the electric vehicle by controlling the charge circuit interrupting device in response to the current sensor.

23. The electric vehicle supply equipment of claim 22, wherein the overcurrent protection circuit comprises an overcurrent protection circuit integral with the controller.

24. The electric vehicle supply equipment of claim 23, wherein the overcurrent protection circuit utilizes the current sensor, and the current sensor is coupled to the controller.

25. The electric vehicle supply equipment of claim 22, wherein the overcurrent protection circuit comprises an overcurrent protection circuit separate from the controller.

26. The electric vehicle supply equipment of claim 22, wherein the overcurrent protection circuit comprises an overcurrent protection circuit partially integral with the controller.

27. The electrical vehicle supply equipment of claim 22, further comprising a metering circuit to measure current flowing to an electric vehicle.

28. The electric vehicle supply equipment of claim 22, wherein the overcurrent protection circuit operates in response to a current limit that is set by the manufacturer of the electrical vehicle supply equipment.

29. The electric vehicle supply equipment of claim 22, wherein the overcurrent protection circuit operates in response to a current limit that is set manually via a user interface incorporated into the electrical vehicle supply equipment.

30. The electrical vehicle supply equipment of claim 29, wherein the user interface includes a wireless interface to enable a user to input the current limit through a wireless connection via a computer or smart phone.

31. The electrical vehicle supply equipment of claim 29, wherein the user interface includes a wireless interface to enable a local utility to set the current limit.

32. The electrical vehicle supply equipment of claim 31, wherein local utility sets the current limit based on time-of-day, demand response, or off-peak utility rates.

33. The electrical vehicle supply equipment of claim 29, wherein the user interface includes a potentiometer or alphanumeric display with menu-driven buttons to enable a user to input one or more current limits.

34. The electrical vehicle supply equipment of claim 22, wherein the overcurrent protection circuit operates in response to a current limit that is provided by an energy management system or an electric utility.

35. The electrical vehicle supply equipment of claim 22, wherein the overcurrent protection circuit operates in response to a current limit that is coordinated with a charging capacity of the electrical vehicle supply equipment as indicated by a control pilot signal.

36. The electrical vehicle supply equipment of claim 22, wherein the overcurrent protection circuit further includes an alarm feature that activates when the current has been or will be interrupted.

\* \* \* \* \*